(12) United States Patent
Moriwaki et al.

(10) Patent No.: US 12,107,626 B2
(45) Date of Patent: Oct. 1, 2024

(54) WAVELENGTH MONITORING DEVICE AND CONTROLLING METHOD THEREOF

(71) Applicant: Nippon Telegraph and Telephone Corporation, Tokyo (JP)

(72) Inventors: Osamu Moriwaki, Musashino (JP); Takashi Saida, Musashino (JP); Kenya Suzuki, Musashino (JP); Takashi Go, Musashino (JP); Manabu Oguma, Musashino (JP); Yuichiro Ikuma, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 462 days.

(21) Appl. No.: 17/420,639

(22) PCT Filed: Jan. 8, 2020

(86) PCT No.: PCT/JP2020/000244
§ 371 (c)(1),
(2) Date: Jul. 2, 2021

(87) PCT Pub. No.: WO2020/145285
PCT Pub. Date: Jul. 16, 2020

(65) Prior Publication Data
US 2022/0086538 A1 Mar. 17, 2022

(30) Foreign Application Priority Data
Jan. 11, 2019 (JP) .................................. 2019-003796

(51) Int. Cl.
H04B 10/079 (2013.01)
G01J 3/45 (2006.01)
(Continued)

(52) U.S. Cl.
CPC .......... *H04B 10/07957* (2013.01); *G01J 3/45* (2013.01); *G02B 6/2935* (2013.01);
(Continued)

(58) Field of Classification Search
CPC ... H04B 10/07957; H04B 10/079; G01J 3/45; G02B 6/12009; G02B 6/125;
(Continued)

(56) References Cited

U.S. PATENT DOCUMENTS

2002/0093660 A1 7/2002 Maeda
2002/0149780 A1* 10/2002 Trinh .................... G01J 9/0246
356/477
(Continued)

FOREIGN PATENT DOCUMENTS

EP 1 850 170 A1 10/2007
JP 2002-214049 A 7/2002
(Continued)

OTHER PUBLICATIONS

Go et al., Machine Translation of JP-2008177759-A, Jul. 2008. (Year: 2008).*

*Primary Examiner* — Michelle R Connelly
(74) *Attorney, Agent, or Firm* — Workman Nydegger

(57) ABSTRACT

A wavelength monitoring apparatus includes a wavelength monitoring circuit. The wavelength monitoring circuit includes: a split circuit that splits an input optical signal into two; an optical delay circuit that applies a delay time difference to the two split optical signals; and a two-input two-output optical multiplexer/demultiplexer circuit that outputs a result of applying multiplexing interference to the optical signals to which the delay time difference has been applied. The wavelength monitoring apparatus further includes photoelectric conversion elements that perform photoelectric conversions on the two optical signals output
(Continued)

from the wavelength monitoring circuit so as to output electrical signals. The wavelength monitoring apparatus is configured to obtain the wavelength of the optical signal, by calculating a ratio between two electrical outputs of the photoelectric conversion elements and referring to a correspondence table indicating wavelengths of optical signals input to the wavelength monitoring circuit and ratios between electrical outputs.

4 Claims, 10 Drawing Sheets

(51) Int. Cl.
  *G02B 6/293* (2006.01)
  *H04B 10/572* (2013.01)
  *H04Q 11/00* (2006.01)
(52) U.S. Cl.
  CPC ....... *G02B 6/2938* (2013.01); *G02B 6/29385* (2013.01); *H04B 10/572* (2013.01); *H04Q 11/0005* (2013.01); *H04Q 2011/0011* (2013.01); *H04Q 2011/0015* (2013.01); *H04Q 2011/0016* (2013.01)

(58) Field of Classification Search
  CPC . G02B 2006/12159; G02B 2006/12164; H04J 14/02
  See application file for complete search history.

(56) References Cited

U.S. PATENT DOCUMENTS

| | | | |
|---|---|---|---|
| 2012/0082414 A1* | 4/2012 | Sakamaki | H04B 10/65 385/31 |
| 2015/0076990 A1 | 3/2015 | Uesaka et al. | |
| 2015/0085292 A1* | 3/2015 | Uesaka | G02B 6/12007 356/477 |
| 2018/0100967 A1 | 4/2018 | Parker et al. | |

FOREIGN PATENT DOCUMENTS

| | | | |
|---|---|---|---|
| JP | 2008177759 A | * | 7/2008 |
| JP | 2015-68854 A | | 4/2015 |
| JP | 6176784 B2 | | 7/2017 |

* cited by examiner

WAVELENGTH MONITORING DEVICE AND CONTROLLING METHOD THEREOF

TECHNICAL FIELD

The present invention relates to an optical device used in an optical communication network and, in particular, to a wavelength monitoring apparatus and a wavelength monitoring method for efficiently monitoring wavelengths of optical signals with a high level of accuracy.

BACKGROUND ART

With the widespread of the Internet, the demand for data communication networks is explosively increasing. To increase the capacity of optical communication networks to meet the demand, techniques such as Wavelength Division Multiplexing (WDM) communication and the like are being used. In wavelength division multiplexing communication, laser modules of accurately controlled emission wavelengths are indispensable. To this end, there is a need for wavelength monitoring circuits and wavelength monitoring methods for monitoring the emission wavelengths of the laser modules.

FIG. 9 is a conceptual configuration diagram of a conventional wavelength monitoring circuit. The conventional commonly-used wavelength monitoring circuit includes a beam splitter 702 that splits a part of the output light of a wavelength variable laser 701; and a beam splitter 703 that further splits the split light into two. One of the light beams split by the beam splitter 703 is input to a photodiode 704 that monitors optical intensities. The other of the light beams split by the beam splitter 703 is caused to transmit through a periodic filter (typically, an etalon filter) 705, before being input to a photodiode 706 that monitors optical intensities.

The ratio $I_{PD2} \div I_{PD1}$ between an output current $I_{PD2}$ of the photodiode 706 and an output current $I_{PD1}$ of the photodiode 704 is transmittance of the etalon filter 705 for this wavelength. Accordingly, it is possible to find out the wavelength of the optical signal being input, by generating, in advance, a correspondence table indicating transmittance values of the etalon filter 705 and wavelengths of the optical signal. Further, by learning, in advance, the transmittance of the etalon filter 705 corresponding to a desired wavelength and exercising control so that $I_{PD2} \div I_{PD1}$ becomes equal to the transmittance, it is possible to control the emission wavelength of a laser module so as to be the desired wavelength.

It should be noted that, however, when the wavelength of the optical signal monitored in this configuration is at the peak or bottom of the transmittance of the etalon filter 705, the value of $I_{PD2} \div I_{PD1}$ hardly changes in relation to very small changes in the wavelength of the optical signal. In other words, the level of accuracy for determining the wavelength of the optical signal is degraded in relation to the measured transmittance $I_{PD2} \div I_{PD1}$. It is therefore not possible to determine the wavelength with a high level of accuracy.

As a configuration to correct the shortcomings of such a conventional wavelength monitoring circuit that has a wavelength band unsuitable for use, another configuration of a wavelength monitoring circuit shown in FIG. 10 is known.

In comparison to the configuration in FIG. 9, in the configuration in FIG. 10, a beam splitter 707 is added to a position between the beam splitter 703 and the etalon filter 705, so that the signals further split by the beam splitter 707 are caused to transmit through an etalon filter 708 before being input to a photodiode 709. In this situation, the etalon filter 708 has the same periodic filtering characteristic as that of the etalon filter 705, but the characteristic thereof is staggered by one-fourth of the cyclic period.

When an output current of the photodiode 709 is expressed as $I_{PD3}$, when the transmittance $I_{PD2} \div I_{PD1}$ of the etalon filter 705 is at the peak or bottom, the transmittance $I_{PD3} \div I_{PD1}$ of the etalon filter 708 is not at the peak or bottom, and vice versa. Accordingly, by appropriately selecting the transmittance of the etalon filter as either $I_{PD2} \div I_{PD1}$ or $I_{PD3} \div I_{PD1}$ for each wavelength of the optical signal, it is possible to find out the wavelength of the optical signal with a high level of accuracy, regardless of the wavelength of the optical signal (see Patent Literature 1).

CITATION LIST

Patent Literature

Patent Literature 1: Japanese Patent No. 6176784

SUMMARY OF THE INVENTION

Technical Problem

According to the conventional wavelength monitoring circuit and wavelength monitoring method, the more significantly the value of $I_{PD2} \div I_{PD1}$ or $I_{PD2} \div I_{PD1}$ changes in relation to a very small change $\Delta\lambda$ in the wavelength, the more accurately it is possible to monitor the wavelength. To make the value of $I_{PD2} \div I_{PD1}$ or $I_{PD3} \div I_{PD1}$ change significantly in relation to the very small change $\Delta\lambda$ in the wavelength, a method is known by which wavelength dependencies of the transmittance of the etalon filters 705 and 708 is made steeper, i.e., repetitive cycles of the etalon filters 705 and 708 are shortened.

However, when the repetitive cycles of the etalon filters 705 and 708 are shortened, it means that wavelengths having the same filter transmittance are at a shorter interval with each other. When the interval falls within a rough adjustment range for the emission wavelength of the wavelength variable laser 701, it is impossible to determine the emission wavelength in one-to-one correspondence. Thus, a problem remains where the repetitive cycle of the filter cannot be shortened unlimitedly.

Further, according to the conventional wavelength monitoring circuit and wavelength monitoring method, it is necessary to provide the dedicated photodiode 704 for monitoring the optical intensities. As a result, there is a problem where the efficiency in utilizing the optical signals is not very high. In other words, it is not possible to input all the optical signals to the etalon filters having the periodic filtering characteristic.

An object of the present invention, which has been made in view of the problems described above, is to provide a wavelength monitoring apparatus and a wavelength monitoring method capable of improving the level of accuracy in monitoring wavelengths of optical signals, without changing the repetitive cycle of a filter.

Means for Solving the Problem

To achieve the object, a first aspect of the present invention provides a wavelength monitoring apparatus. A wavelength monitoring apparatus according to an embodiment includes: a wavelength monitoring circuit including a split circuit that splits an input optical signal into two, an optical delay circuit that applies a delay time difference to the two split optical signals, and a two-input two-output optical multiplexer/demultiplexer circuit that outputs a result of applying multiplexing interference to the optical signals to which the delay time difference has been applied; and a photoelectric conversion element that performs a photoelectric conversion on the two optical signals output from the wavelength monitoring circuit so as to output electrical signals, wherein the wavelength monitoring apparatus is configured to obtain a wavelength of the optical signal input to the wavelength monitoring circuit, by calculating a ratio between two electrical outputs of the photoelectric conversion element and referring to a correspondence table indicating wavelengths of optical signals input to the wavelength monitoring circuit and ratios between electrical outputs.

A second aspect of the present invention provides a wavelength monitoring method. A wavelength monitoring method according to an embodiment includes: splitting an optical signal input to a wavelength monitoring circuit into two; applying a delay time difference to the two split optical signals; outputting a result of applying multiplexing interference to the optical signals to which the delay time difference has been applied; performing a photoelectric conversion on the two optical signals being output so as to output electrical signals; calculating a ratio between electrical outputs resulting from the photoelectric conversions performed on the two optical signals; and obtaining a wavelength of the optical signal input to the wavelength monitoring circuit, by referring to a correspondence table indicating wavelengths of optical signals input to the wavelength monitoring circuit and ratios between electrical outputs.

Effects of the Invention

As explained above, according to the present invention, it is possible to provide the wavelength monitoring apparatus and the wavelength monitoring method capable of obtaining the wavelength with a higher level of accuracy than in the conventional examples. Further, according to the present invention, there is no need to use the photoelectric conversion element that has conventionally been used for monitoring optical intensities. Accordingly, even the signals that are split for the purpose of monitoring optical intensities in the conventional examples are now all input to the wavelength monitoring circuit and are used for determining the wavelength. It is therefore possible to provide a wavelength monitoring apparatus and a wavelength monitoring method that also have high tolerance to noise.

DESCRIPTION OF EMBODIMENTS

Figure 1:
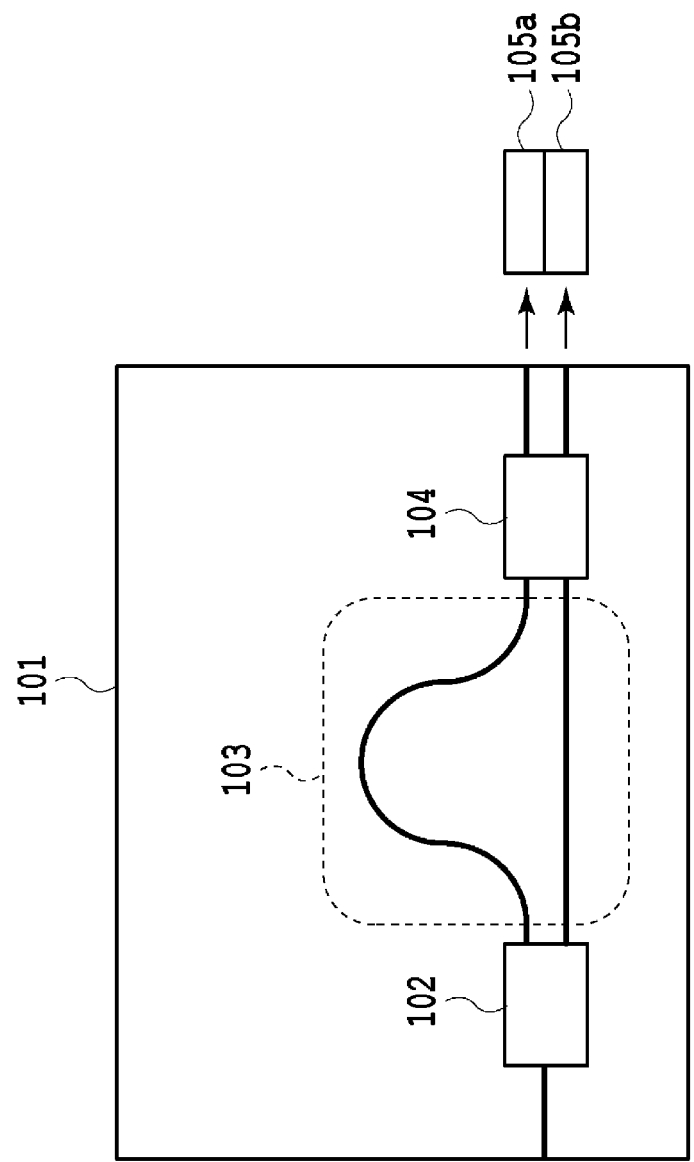
FIG. 1 is a schematic diagram of an optical system used in a wavelength monitoring circuit and a wavelength monitoring method according to a first embodiment of the present invention.

To solve the problems presented above, the present invention provides a wavelength monitoring apparatus and a wavelength monitoring method capable of improving the level of accuracy in monitoring wavelengths of optical signals without changing the repetitive cycle of a filter. Further, the present invention provides a wavelength monitoring apparatus and a wavelength monitoring method that achieve high efficiency in utilizing optical signals, without using a dedicated photodiode for monitoring optical intensities.

A wavelength monitoring apparatus according to an embodiment includes a wavelength monitoring circuit. The wavelength monitoring circuit includes: a split circuit that splits an input optical signal into two; an optical delay circuit that applies a delay time difference to the two split optical signals; and a two-input two-output optical multiplexer/demultiplexer circuit that outputs a result of applying multiplexing interference to the optical signals to which the delay time difference has been applied. The wavelength monitoring apparatus further includes a photoelectric conversion element that performs a photoelectric conversion on the two optical signals output from the wavelength monitoring circuit so as to output electrical signals and is configured to obtain a wavelength of the optical signal, by calculating a ratio between two electrical outputs of the photoelectric conversion element and referring to a correspondence table indicating wavelengths of optical signals input to the wavelength monitoring circuit and ratios between electrical outputs.

A wavelength monitoring apparatus according to an embodiment includes a wavelength monitoring circuit. The wavelength monitoring circuit includes: a first split circuit that splits an input optical signal into two; a first optical delay circuit that applies a delay time difference to the two split optical signals; second and third split circuits that each further split, into two, a different one of the two optical signals to which the delay time difference has been applied; a second optical delay circuit that applies a delay time difference to each of sets of optical signals derived from four optical signals resulting from the two-way splits by the second and the third split circuits, the sets each being made up of two optical signals to which mutually-different delay time differences have been applied by the first optical delay circuit; and first and second two-input two-output optical multiplexer/demultiplexer circuits that each output a result of applying multiplexing interference to the optical signals to which the delay time difference has been applied. A difference between the delay time differences applied by the second optical delay circuit to a first set of optical signals and to a second set of optical signals can be expressed as $\lambda/4c$ (where $\lambda$ is any of wavelengths in an optical signal wavelength band being monitored, while c is a speed of light). The wavelength monitoring apparatus further includes a photoelectric conversion element that performs a photoelectric conversion on the four optical signals output from the wavelength monitoring circuit so as to output electrical signals and is configured to obtain a wavelength of the optical signal, by calculating a ratio between electrical outputs in the first set of optical signals and a ratio between electrical outputs in the second set of optical signals that are output from the photoelectric conversion element and referring to a correspondence table indicating wavelengths of optical signals input to the wavelength monitoring circuit and ratios between electrical outputs.

A wavelength monitoring apparatus according to an embodiment includes a wavelength monitoring circuit. The wavelength monitoring circuit includes: a first split circuit that splits an input optical signal into two; a first optical delay circuit that applies a delay time difference to the two split optical signals; a second split circuit that further splits, into two, one of the two optical signals to which the delay time difference has been applied and that outputs optical signals in a mutually same phase; a third split circuit that further splits, into two, other of the two optical signals to which the delay time difference has been applied and that outputs optical signals having a 90-degree phase difference; and first and second two-input two-output optical multiplexer/demultiplexer circuits that each receive an input, via equal-length optical waveguides, of a different one of sets of optical signals derived from four optical signals resulting from the two-way splits by the second and the third split circuits and that each output a result of multiplexing interference, the sets each being made up of two optical signals to which mutually-different delay time differences have been applied by the first optical delay circuit. The wavelength monitoring apparatus further includes a photoelectric conversion element that performs a photoelectric conversion on the four optical signals output from the wavelength monitoring circuit so as to output electrical signals and is configured to obtain a wavelength of the optical signal, by calculating a ratio between electrical outputs in a first set of optical signals and a ratio between electrical outputs in a second set of optical signals that are output from the photoelectric conversion element and referring to a correspondence table indicating wavelengths of optical signals input to the wavelength monitoring circuit and ratios between electrical outputs.

In the wavelength monitoring apparatus, the photoelectric conversion element that performs the photoelectric conversion on the four optical signals output from the wavelength monitoring circuit so as to output the electrical signals may not be provided with a photoelectric conversion element that receives an input of one optical signal in the second set of optical signals output from the second two-input two-output optical multiplexer/demultiplexer circuit. In that situation, the wavelength monitoring apparatus may be configured to obtain the wavelength of the optical signal, by using, in place of the electrical output that would be obtained from this photoelectric conversion element, a value obtained by subtracting the electrical output being output from the photoelectric conversion element receiving an input of the other optical signal in the second set of optical signals, from a sum of the electrical outputs being output from the photoelectric conversion element receiving an input of the first set of optical signals.

Further, in the wavelength monitoring apparatus, the photoelectric conversion element that performs the photoelectric conversion on the four optical signals output from the second two-input two-output optical multiplexer/demultiplexer circuit of the wavelength monitoring circuit so as to output the electrical signals may not be provided with a photoelectric conversion element that receives an input of one optical signal in the second set of optical signals. In that situation, the wavelength monitoring apparatus may be configured to obtain the wavelength of the optical signal, by calculating a ratio between one of the electrical outputs being output from the photoelectric conversion element receiving an input of the first set of optical signals and a sum of the electrical outputs being output from the photoelectric conversion element receiving an input of the first set of optical signals; and another ratio between the electrical output being output from the photoelectric conversion element receiving an input of the other optical signal in the second set of optical signals and a sum of the electrical outputs being output from the photoelectric conversion element receiving an input of the first set of optical signals and referring to the correspondence table indicating the wavelengths of the optical signals input to the wavelength monitoring circuit and the ratios between the electrical outputs.

The wavelength monitoring apparatus may also be configured to input the optical signals output from the wavelength monitoring circuit to the photoelectric conversion element so as to obtain the electrical outputs and configured to obtain an optical intensity of the optical signal by referring to a correspondence table indicating wavelengths of optical signals input to the wavelength monitoring circuit and values each calculated as "an optical intensity÷an electrical output".

The following will describe various embodiments of the present invention in detail, with reference to the drawings. The same or similar reference characters refer to the same or similar elements, and duplicate explanations thereof will be omitted.

First Embodiment

A wavelength monitoring apparatus and a wavelength monitoring method according to a first embodiment of the present invention will be explained, with reference to FIG. 1. The wavelength monitoring circuit 101 shown in FIG. 1 is merely an example, and the present invention is not limited to this example. Wavelength monitoring apparatuses may each include one or more of the various characteristics described above.

As shown in FIG. 1, the wavelength monitoring circuit 101 includes: a two-way optical split circuit 102 that splits an input optical signal into two; an optical delay circuit 103 that applies a differential delay to the two split optical signals; and a two-input two-output optical multiplexer/demultiplexer circuit 104 that outputs a result of applying multiplexing interference to the optical signals to which the delay time difference has been applied. A wavelength monitoring apparatus includes: the wavelength monitoring circuit 101; and photoelectric conversion elements 105a and 105b that perform a photoelectric conversion on the two optical signals being output as the result of the multiplexing interference, so as to yield electrical outputs. The wavelength monitoring apparatus includes a computation apparatus (not shown) including a processor and a memory and is configured to obtain the wavelength of the input optical signal, by calculating a ratio between the two electrical outputs of the photoelectric conversion elements and referring to a correspondence table generated in advance indicating wavelengths of the input optical signal and calculated ratios between the two electrical outputs.

In FIG. 1, the optical signal input to the wavelength monitoring circuit 101 is split by the two-way optical split circuit 102, has the delay time difference applied thereto by the optical delay circuit 103 that has optical paths have mutually-different lengths, and subsequently undergoes the multiplexing interference applied by the two-input two-output optical multiplexer/demultiplexer circuit 104 before being output.

The output optical signals are converted into the electrical signals (current values) by the photoelectric conversion elements 105a and 105b.

Figure 2:
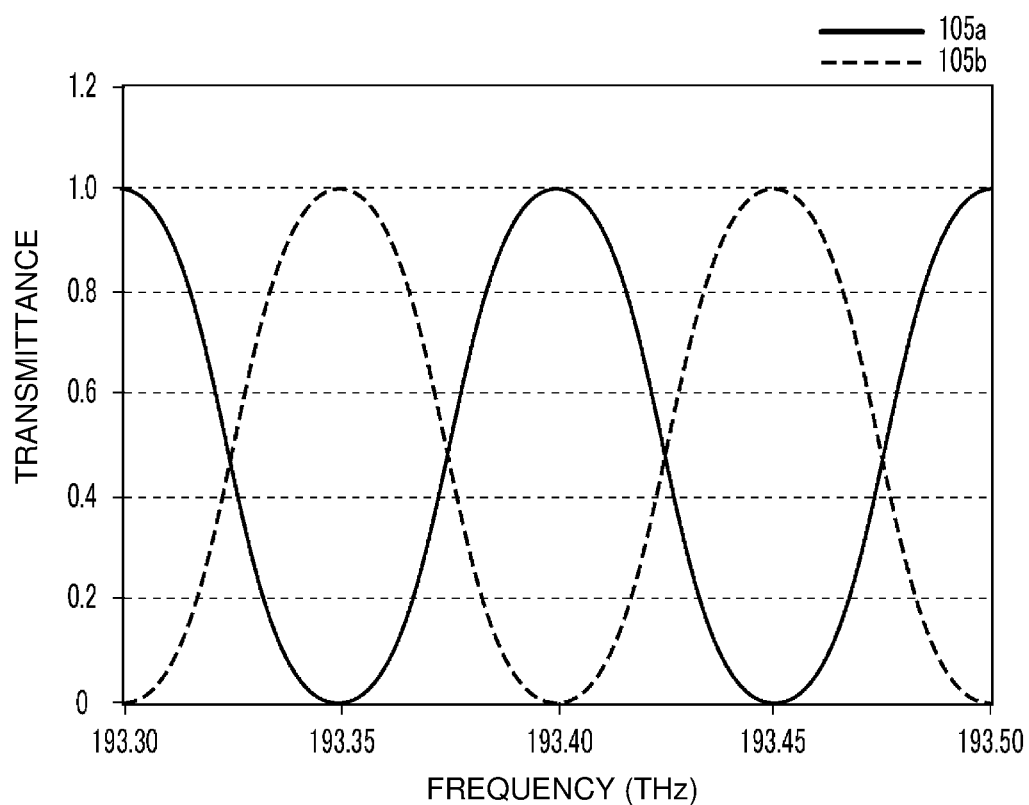
FIG. 2 is a chart showing an example of a frequency (wavelength) dependency of transmittance of output ports used in the wavelength monitoring circuit and the wavelength monitoring method according to the first embodiment of the present invention.

FIG. 2 shows an example of a frequency (wavelength) dependency of transmittance of two output ports included in the two-input two-output optical multiplexer/demultiplexer circuit 104 of the wavelength monitoring circuit 101.

In the example in FIG. 2, the repetitive cycle of the wavelength dependency is 100 GHz. The repetitive cycle is equal to the reciprocal (10 ps in the present example) of the delay time difference applied by the optical delay circuit 103. By varying the delay time difference applied by the optical delay circuit 103, it is possible to set the repetitive cycle to any of various values.

It is possible to express the wavelength dependency of the transmittance of the two output ports included in the two-input two-output optical multiplexer/demultiplexer circuit 104 of the wavelength monitoring circuit 101, by multiplying the following expressions by a prescribed constant, where f (GHz) denotes the frequency of the optical signal, whereas $\varphi$ denotes a constant determined for each wavelength monitoring circuit:

$$0.5+0.5\ \cos(2\pi f/100+\varphi) \quad \text{(Expression 1)}$$

$$0.5-0.5\ \cos(2\pi f/100+\varphi) \quad \text{(Expression 2)}.$$

The optical signals output from the two-input two-output optical multiplexer/demultiplexer circuit 104 of the wavelength monitoring circuit are converted into the electrical signals (the current values) by the photoelectric conversion elements 105a and 105b.

The electrical signal (the current value) obtained from each of the photoelectric conversion elements is proportional to "the transmittance of the wavelength monitoring circuit" X "the optical intensity of the input optical signal". Accordingly, it is impossible to find out the wavelength of the optical signal from the electrical signal (the current value) alone obtained from a single photoelectric conversion element. However, when the ratio between the electrical signals (the current values) obtained from the two photoelectric conversion elements 105a and 105b is calculated, it is possible to offset the contribution of "the optical intensity of the input optical signal". It is therefore possible to bring the ratio between the electrical signals (the current values) into association with the wavelength (the frequency) of the optical signal, according to Expressions 3 and 4 shown below:

$$\{1+\cos(2\pi f/100+\varphi)\}/\{1-\cos(2\pi f/100+\varphi)\} \quad \text{(Expression 3); or}$$

$$\{1-\cos(2\pi f/100+\varphi)\}/\{1+\cos(2\pi f/100+\varphi)\} \quad \text{(Expression 4).}$$

Accordingly, with respect to each wavelength (frequency) of the optical signal, by measuring the ratio between the electrical signals (the current values) in advance and generating and referring to a correspondence table, it is possible to obtain the wavelength of the input optical signal on the basis of the ratio between the measured electrical signals (current values).

Figure 3:
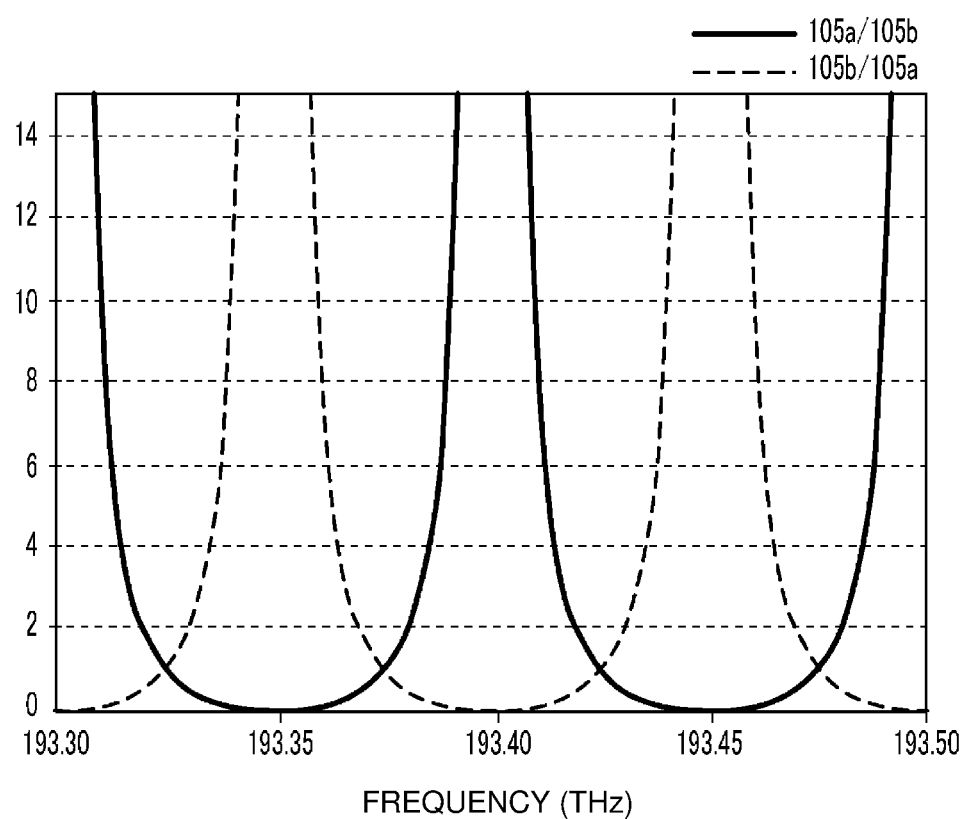
FIG. 3 is a chart showing an example of a wavelength monitoring curve in the wavelength monitoring circuit and the wavelength monitoring method according to the first embodiment of the present invention.

FIG. 3 is a chart of a wavelength monitoring curve obtained by plotting frequencies of the optical signal on the horizontal axis and Expressions 3 and 4 (where $\varphi=0$) on the vertical axis.

Compared to transmittance charts used in conventional wavelength monitoring processes such as the chart in FIG. 2, the chart in FIG. 3 exhibits a characteristic of having steep changes (where the values on the vertical axis change significantly in relation to very small changes in the frequency (the wavelength) of the optical signal).

Because of this characteristic, the wavelength monitoring apparatus and the wavelength monitoring method according to the present embodiment are able to obtain the wavelength with a higher level of accuracy than the conventional wavelength monitoring method.

It should be noted that the wavelength monitoring apparatus and the wavelength monitoring method according to the present embodiment are not capable of obtaining information about optical intensities which the conventional wavelength monitoring apparatus and wavelength monitoring method are capable of obtaining directly. However, when the wavelength of the optical signal has become clear, because the transmittance of the wavelength monitoring circuit is determined in one-to-one correspondence, it is also possible to obtain the optical intensity of the optical signal by dividing the electrical signals (the current values) obtained from the photoelectric conversion elements by the transmittance of the wavelength monitoring circuit and multiplying the result by a prescribed coefficient.

Further, the increase in required memory capacity will be minor, even when a coefficient table is generated and stored in advance, in correspondence with each wavelength (frequency) of the optical signal, for the purpose of obtaining the optical intensity of the optical signal, the coefficient table being used for converting electrical signals (current values) obtained from the photoelectric conversion elements into an optical intensity of the optical signal.

Figure 10:
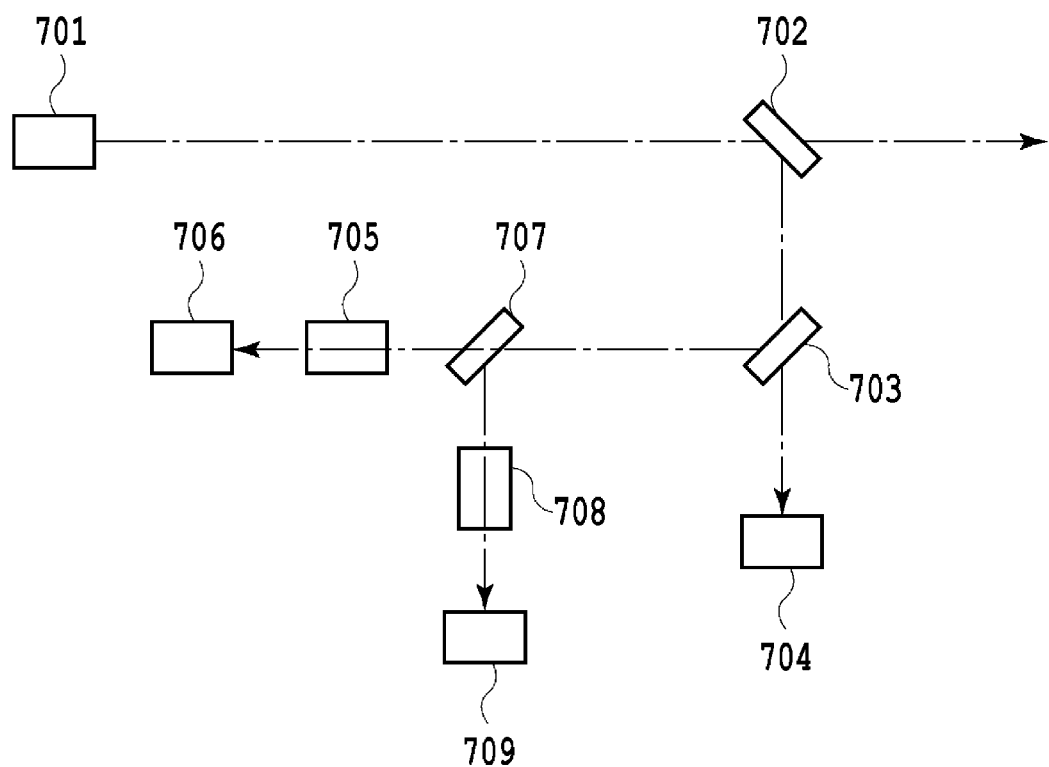
FIG. 10 is a conceptual configuration diagram of another conventional wavelength monitoring circuit.

The wavelength monitoring apparatus and the wavelength monitoring method according to the present embodiment do not need to use a dedicated photoelectric conversion element for monitoring the optical intensity (e.g., the photodiode 704 in FIG. 10), which is required in the conventional wavelength monitoring apparatus and wavelength monitoring method. Accordingly, even the signals that are split in the conventional technique for the purpose of monitoring the optical intensities may be now all input to the optical wavelength monitoring circuit. It is therefore possible to provide an optical wavelength monitoring method that also has high tolerance to noise.

Second Embodiment

Figure 4:
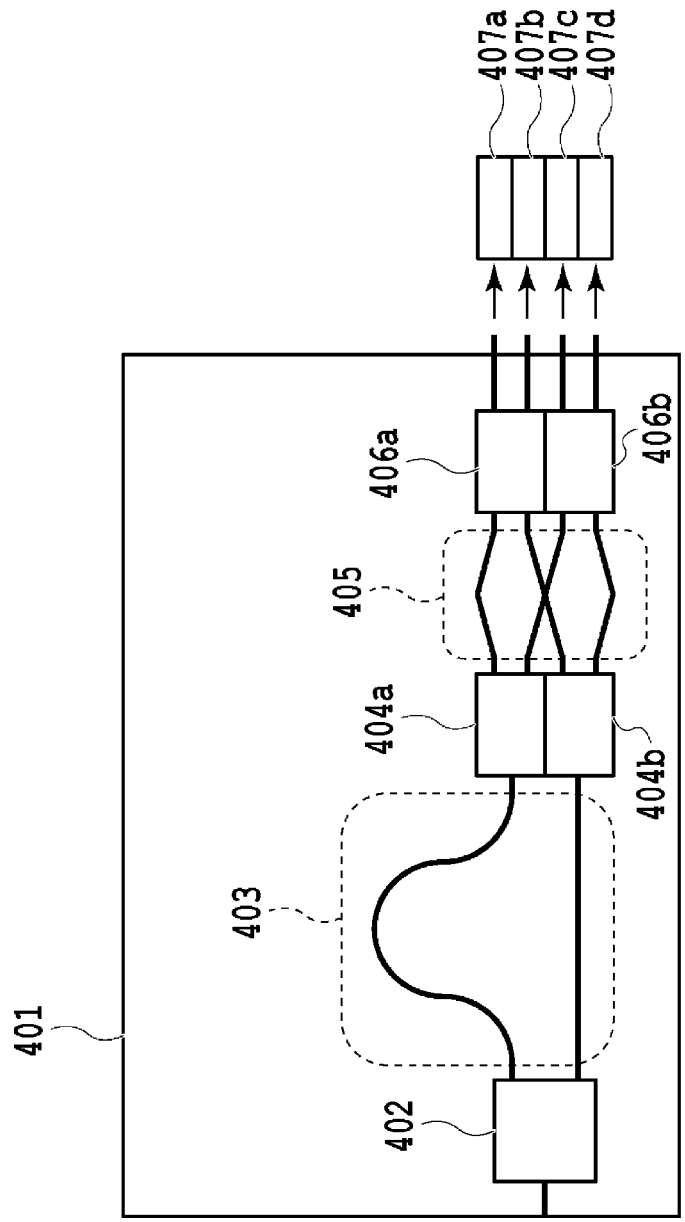
FIG. 4 is a schematic diagram of an optical system used in a wavelength monitoring circuit and a wavelength monitoring method according to a second embodiment of the present invention.

A wavelength monitoring apparatus and a wavelength monitoring method according to a second embodiment will be explained, with reference to FIG. 4. The wavelength monitoring circuit 401 shown in FIG. 4 is merely an example, and the present invention is not limited to this example. Wavelength monitoring apparatuses may each include one or more of the various characteristics described above.

As shown in FIG. 4, the wavelength monitoring circuit 401 includes: a two-way optical split circuit 402 that splits an input optical signal into two; an optical delay circuit 403 that applies a differential delay to the two split optical signals; two-way optical split circuits 404a and 404b each of which further splits, into two, a different one the optical signals to which the delay time difference has been applied; an optical delay circuit 405 that further applies a differential delay to the optical signals resulting from the two-way splits; and two two-input two-output optical multiplexer/demultiplexer circuits 406a and 406b that output results of applying multiplexing interference to the optical signals to which the differential delay has been further applied. A wavelength monitoring apparatus includes: the wavelength monitoring circuit 401; and photoelectric conversion elements 407a to 407d that perform photoelectric conversions on the four optical signals being output as the results of the multiplexing interference, so as to yield electrical outputs. The wavelength monitoring apparatus includes a computation apparatus (not shown) including a processor and a memory and is configured to obtain the wavelength of the input optical signal, by calculating ratios between the four electrical outputs of the photoelectric conversion elements and referring to a correspondence table generated in advance indicating wavelengths of the input optical signal and calculated ratios between the four electrical outputs.

In FIG. 4, the optical signal input to the wavelength monitoring circuit 401 is split by the two-way optical split circuit 402, has the delay time difference applied thereto by the first optical delay circuit 403 that has optical paths have mutually-different lengths, is further split by the two-way optical split circuits 404a and 404b, has the delay time difference applied thereto by the second optical delay circuit 405, and subsequently undergoes the multiplexing interference applied by the first two-input two-output optical multiplexer/demultiplexer circuit 406a and the second two-input two-output optical multiplexer/demultiplexer circuit 406b before being output.

In the present example, the optical signals input to the first two-input two-output optical multiplexer/demultiplexer circuit 406a are one of the outputs of the two-way optical split circuit 404a and one of the outputs of the two-way optical split circuit 404b. Further, the optical signals input to the second two-input two-output optical multiplexer/demultiplexer circuit 406b are the other of the outputs of the two-way optical split circuit 404a and the other of the outputs of the two-way optical split circuit 404b.

The optical signals output from the two-input two-output optical multiplexer/demultiplexer circuits 406a and 406b are converted into electrical signals (current values) by the photoelectric conversion elements 407a, 407b, 407c, and 407d.

For the delay time difference applied by the second optical delay circuit 405, the difference between the delay time difference applied to the optical signals input to the first two-input two-output optical multiplexer/demultiplexer circuit 406a and the delay time difference applied to the optical signals input to the second two-input two-output optical multiplexer/demultiplexer circuit 406b is important, which satisfies $\lambda/4c$ where $\lambda$ denotes any of wavelengths in a wavelength band (e.g., 1530 nm to 1565 nm), wavelengths of which are monitored, while c is the speed of light.

Figure 5:
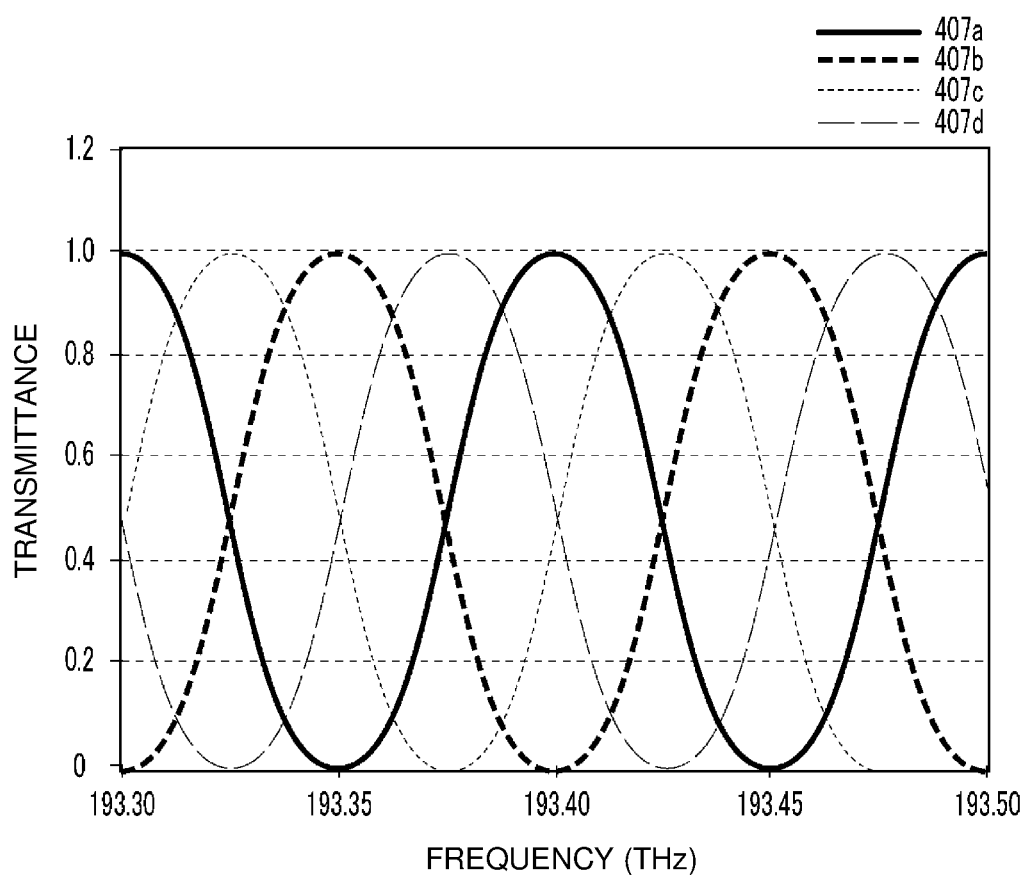
FIG. 5 is a chart showing an example of a frequency (wavelength) dependency of transmittance of output ports used in the wavelength monitoring circuit and the wavelength monitoring method according to the second embodiment of the present invention.

FIG. 5 shows an example of a frequency (wavelength) dependency of transmittance of four output ports included in the two-input two-output optical multiplexer/demultiplexer circuits 406a and 406b of the wavelength monitoring circuit 401.

In the example shown in FIG. 5, the repetitive cycle of the wavelength dependency is 100 GHz. The repetitive cycle is equal to the reciprocal (10 ps in the present example) of the delay time difference applied by the first optical delay circuit 403 (in the situation where the delay time difference applied by the second optical delay circuit 405 is sufficiently smaller than the delay time difference applied by the first optical delay circuit 403). By varying the delay time difference applied by the first optical delay circuit 103, it is possible to set the repetitive cycle to any of various values.

It is possible to express the wavelength dependency of the transmittance of the four output ports of the wavelength monitoring circuit 401 by multiplying the following expressions by a prescribed coefficient, where f (GHz) denotes the frequency of the optical signal, whereas φ denotes a constant determined for each wavelength monitoring circuit.

For the ports receiving outputs of the first two-input two-output optical multiplexer/demultiplexer circuit 406a:

$$0.5+0.5 \cos(2\pi f/100+\varphi) \quad \text{(Expression 5)}$$

$$0.5-0.5 \cos(2\pi f/100+\varphi) \quad \text{(Expression 6).}$$

For the ports receiving outputs of the second two-input two-output optical multiplexer/demultiplexer circuit 406b:

$$0.5+0.5 \sin(2\pi f/100+\varphi) \quad \text{(Expression 7)}$$

$$0.5-0.5 \sin(2\pi f/100+\varphi) \quad \text{(Expression 8).}$$

The optical signals output from the two-input two-output optical multiplexer/demultiplexer circuits 406a and 406b of the wavelength monitoring circuit are converted into the electrical signals (the current values) by the photoelectric conversion elements 407a, 407b, 407c, and 407d.

The electrical signal (the current value) obtained from each of the photoelectric conversion elements is proportional to "the transmittance of the wavelength monitoring circuit" X "the optical intensity of the input optical signal". Accordingly, it is impossible to find out the wavelength of the optical signal from the electrical signal (the current value) alone obtained from a single photoelectric conversion element. However, when the ratio between the electrical signals (the current values) obtained from the two photoelectric conversion elements receiving the optical signals output from the same two-input two-output optical multiplexer/demultiplexer circuit is calculated, it is possible to offset the contribution of "the optical intensity of the input optical signal". It is therefore possible to bring the ratios between the electrical signals (the current values) into association with the wavelength (the frequency) of the optical signal according to the expressions presented below.

For the signals output from the first two-input two-output optical multiplexer/demultiplexer circuit 406a:

$$\{1+\cos(2\pi f/100+\varphi)\}/\{1-\cos(2\pi f/100+\varphi)\} \quad \text{(Expression 9); or}$$

$$\{1-\cos(2\pi f/100+\varphi)\}/\{1+\cos(2\pi f/100+\varphi)\} \quad \text{(Expression 10).}$$

For the signals output from the second two-input two-output optical multiplexer/demultiplexer circuit 406b:

$$\{1+\sin(2\pi f/100+\varphi)\}/\{1-\sin(2\pi f/100+\varphi)\} \quad \text{(Expression 11); or}$$

$$\{1-\sin(2\pi f/100+\varphi)\}/\{1+\sin(2\pi f/100+\varphi)\} \quad \text{(Expression 12).}$$

Accordingly, with respect to each wavelength (frequency) of the optical signal, by measuring the ratios between the electrical signals (the current values) in advance and generating and referring to a correspondence table, it is possible to obtain the wavelength of the input optical signal on the basis of the ratios between the measured electrical signals (current values).

Figure 6:
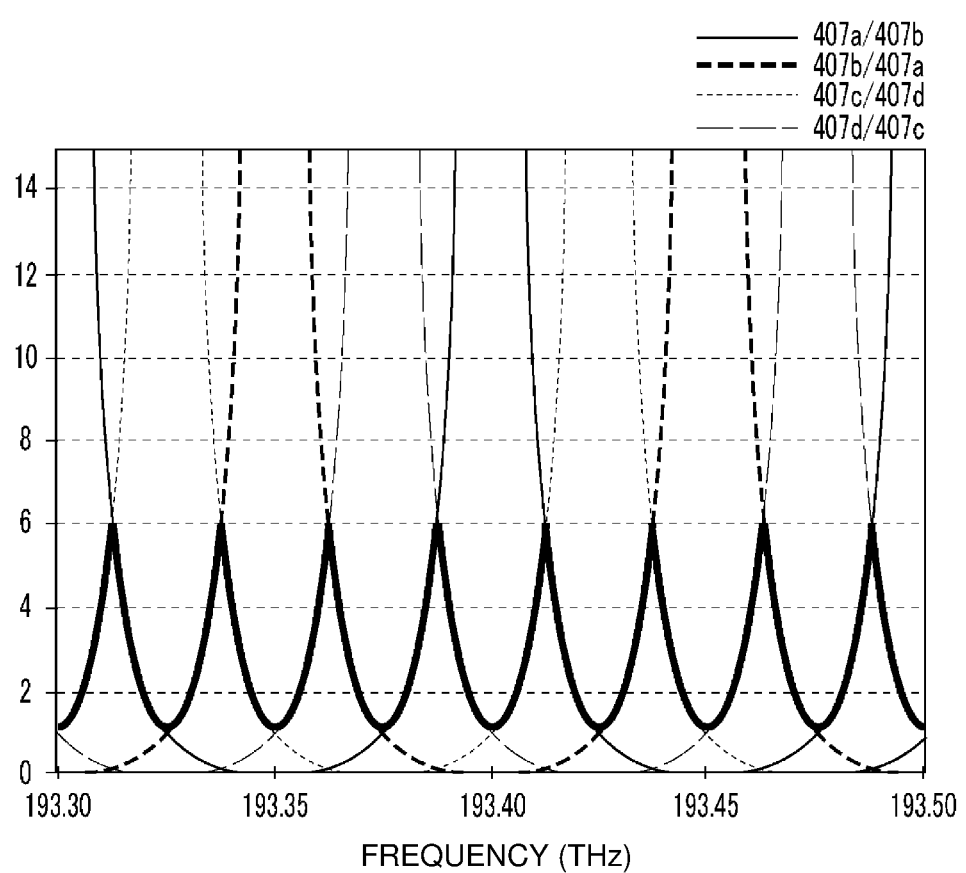
FIG. 6 is a chart showing an example of a wavelength monitoring curve in the wavelength monitoring circuit and the wavelength monitoring method according to the second embodiment of the present invention.

FIG. 6 is a chart of a wavelength monitoring curve obtained by plotting frequencies of the optical signal on the horizontal axis and Expressions 9, 10, 11, and 12 (where φ=0) on the vertical axis.

Compared to transmittance charts used in conventional wavelength monitoring processes such as the chart in FIG. 5, the chart in FIG. 6 exhibits a characteristic of having steep changes (where the values on the vertical axis change significantly in relation to small changes in the frequency (the wavelength) of the optical signal).

Because of this characteristic, the wavelength monitoring apparatus and the wavelength monitoring method according to the present embodiment are able to obtain the wavelength with a higher level of accuracy than the conventional wavelength monitoring apparatus and wavelength monitoring method.

Further, as for the chart plotted in FIG. 6, it is not possible to use the vicinity of the peaks and the vicinity of the bottoms for determining a wavelength. However, it is possible to determine an arbitrary wavelength by using an appropriate one of the four plots, i.e., by selecting the region traced with the bold line in FIG. 6.

It should be noted that the wavelength monitoring apparatus and the wavelength monitoring method according to the present embodiment are not capable of obtaining information about optical intensities which the conventional wavelength monitoring apparatus and wavelength monitoring method are capable of obtaining directly. However, when the wavelength of the optical signal has become clear, because the transmittance of the wavelength monitoring circuit is determined in one-to-one correspondence, it is also possible to obtain the optical intensity of the optical signal by dividing the electrical signals (the current values) obtained from the photoelectric conversion elements by the transmittance of the wavelength monitoring circuit and multiplying the result by a prescribed coefficient.

Further, the increase in required memory capacity will be minor, even when a coefficient table is generated and stored in advance, in correspondence with each wavelength (frequency) of the optical signal, for the purpose of obtaining the optical intensity of the optical signal, the coefficient table being used for converting electrical signals (current values) obtained from the photoelectric conversion elements into an optical intensity of the optical signal.

The wavelength monitoring apparatus and the wavelength monitoring method according to the present embodiment do not need to use a dedicated photoelectric conversion element for monitoring the optical intensity (e.g., the photodiode 704 in FIG. 10), which is required in the conventional wavelength monitoring apparatus and wavelength monitoring method. Accordingly, even the signals that are split in the conventional technique for the purpose of monitoring the optical intensities may be now all input to the optical wavelength monitoring circuit. It is therefore possible to provide an optical wavelength monitoring method that also has high tolerance to noise.

Third Embodiment

Figure 7:
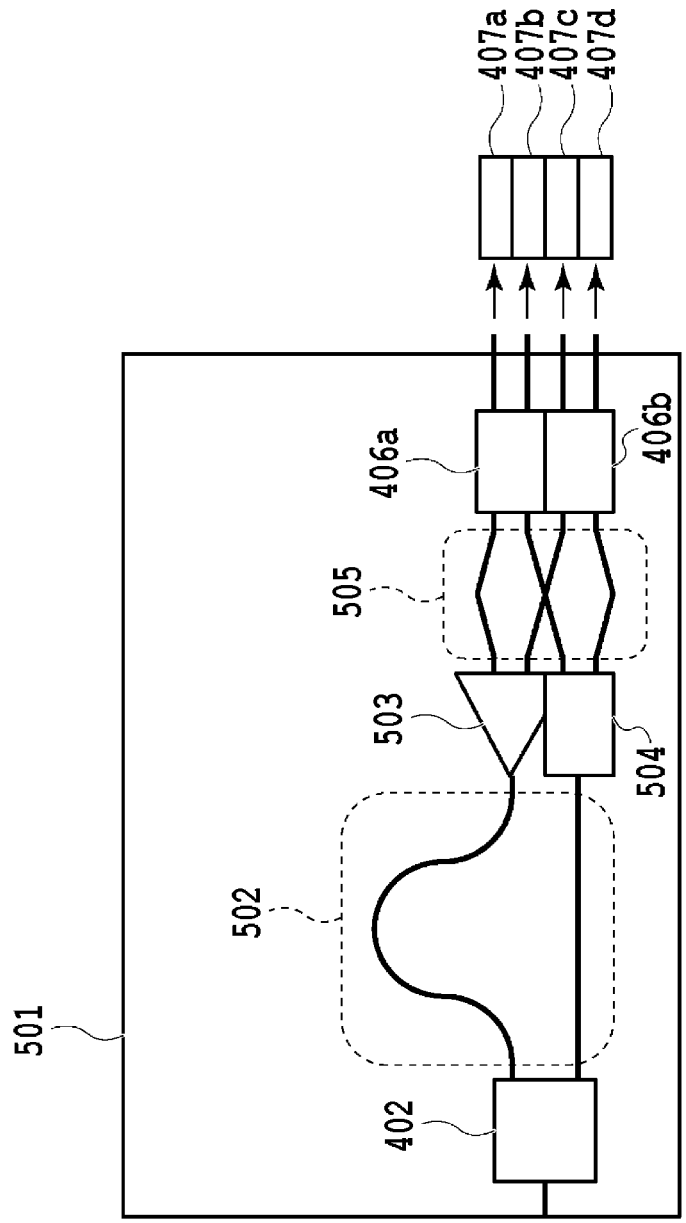
FIG. 7 is a schematic diagram of an optical system used in a wavelength monitoring circuit and a wavelength monitoring method according to a third embodiment of the present invention.

A wavelength monitoring apparatus and a wavelength monitoring method according to a third embodiment of the present invention will be explained, with reference to FIG. 7. The wavelength monitoring circuit 501 shown in FIG. 7 is merely an example, and the present invention is not limited to this example. Wavelength monitoring apparatuses may each include one or more of the various characteristics described above.

As shown in FIG. 7, the wavelength monitoring circuit 501 includes: the two-way optical split circuit 402 that splits an input optical signal into two; an optical delay circuit 502 that applies a differential delay to the optical signals resulting from the two-way splits; two-way optical split circuits 503 and 504 each of which further splits, into two, a different one the optical signals to which the delay time difference has been applied; and the two two-input two-output optical multiplexer/demultiplexer circuits 406a and 406b that receive, via equal-length optical waveguides 505, inputs of the optical signals resulting from the two-way splits and output results of applying multiplexing interference thereto. A wavelength monitoring apparatus includes: the wavelength monitoring circuit 501; and the photoelectric conversion elements 407a to 407d that perform photoelectric conversions on the four optical signals being output as the results of the multiplexing interference, so as to yield electrical outputs. The two-way optical split circuit 503 is a circuit that outputs optical signals in mutually the same phase. The two-way optical split circuit 504 is a circuit that outputs optical signals having a 90-degree phase difference. The wavelength monitoring apparatus includes a computation apparatus (not shown) including a processor and a memory and is configured to obtain the wavelength of the input optical signal, by calculating ratios between the four electrical outputs of the photoelectric conversion elements and referring to a correspondence table generated in advance indicating wavelengths of the input optical signal and calculated ratios between the four electrical outputs.

In FIG. 7, the optical signal input to the wavelength monitoring circuit 501 is split by the two-way optical split circuit 402, has the delay time difference applied thereto by the optical delay circuit 502 that has optical paths have mutually-different lengths; one of the outputs is then split by the two-way optical split circuit 503, the output optical signals of which are in mutually the same phase, whereas the other of the outputs is split by the two-way optical split circuit 504, the output optical signals of which have a 90-degree phase difference; the split signals are subsequently routed through the equal-length optical waveguides 505, and undergo the multiplexing interference applied by the first two-input two-output optical multiplexer/demultiplexer circuit 406a and the second two-input two-output optical multiplexer/demultiplexer circuit 406b before being output.

In this situation, the optical signals input to the first two-input two-output optical multiplexer/demultiplexer circuit 406a are one of the outputs of the two-way optical split circuit 503, the output optical signals of which are in mutually the same phase; and one of the outputs of the two-way optical split circuit 504, the output optical signals of which have the 90-degree phase difference. Further, the optical signals input to the second two-input two-output optical multiplexer/demultiplexer circuit 406b are the other of the outputs of the two-way optical split circuit 503, the output optical signals of which are in mutually the same phase; and the other of the outputs of the two-way optical split circuit 504, the output optical signals of which have the 90-degree phase difference.

It should be noted that the two-way optical split circuit 503, the output optical signals of which are in mutually the same phase, may be an optical splitter including a Y-split waveguide, for example. The two-way optical split circuit 504, the output optical signals of which have the 90-degree phase difference, may be a directional coupler or an MMI coupler, for example.

The optical signals output from the two-input two-output optical multiplexer/demultiplexer circuits 406a and 406b are converted into the electrical signals (the current values) by the photoelectric conversion elements 407a, 407b, 407c, and 407d.

In this situation, when the delay time difference applied by the optical delay circuit 502 is equal to the delay time difference applied by the first optical delay circuit 403 according to the second embodiment, the frequency (wavelength) dependency of the transmittance of the four output ports of the wavelength monitoring circuit 501 is equal to that shown in FIG. 5. In the second embodiment, the phase difference is created as a result of the second optical delay circuit 405 applying the differential delay. In contrast, in the third embodiment, although the phase difference is created by the two-way optical split circuit 504, the frequency (wavelength) dependency of the transmittance of the four output ports of the wavelength monitoring circuit is equal.

Accordingly, when the ratio between the electrical signals (the current values) obtained from the two photoelectric conversion elements receiving the optical signals output from the same two-input two-output optical multiplexer/demultiplexer circuit is calculated, it is possible, similarly to the description of the second embodiment, to bring the ratio between the electrical signals (the current values) into association with the wavelength (the frequency) of the optical signal. Consequently, with respect to each wavelength (frequency) of the optical signal, by measuring the ratios between the electrical signals (the current values) in advance and generating and referring to a correspondence table, it is possible to obtain the wavelength of the input optical signal on the basis of the ratio between the measured electrical signals (current values).

In this situation also, similarly to the second embodiment, the optical wavelength monitoring method according to the present embodiment is able to obtain the wavelength with a higher level of accuracy than the conventional wavelength monitoring method.

It should be noted that the optical wavelength monitoring method according to the present embodiment is not capable of obtaining information about optical intensities which the conventional wavelength monitoring method is capable of obtaining directly. However, when the wavelength of the optical signal has become clear, because the transmittance of the wavelength monitoring circuit is determined in one-to-one correspondence, it is also possible to obtain the optical intensity of the optical signal by dividing the electrical signals (the current values) obtained from the photoelectric conversion elements by the transmittance of the wavelength monitoring circuit and multiplying the result by a prescribed coefficient.

Further, the increase in required memory capacity will be minor, even when a coefficient table is generated and stored in advance, in correspondence with each wavelength (frequency) of the optical signal, for the purpose of obtaining the optical intensity of the optical signal, the coefficient table being used for converting electrical signals (current values) obtained from the photoelectric conversion elements into an optical intensity of the optical signal.

The optical wavelength monitoring method according to the present embodiment does not need to use a photoelectric conversion element for monitoring the optical intensity, which is required in the conventional optical wavelength monitoring method. Accordingly, even the signals that are split in the conventional technique for the purpose of monitoring the optical intensities may be now all input to the optical wavelength monitoring circuit. It is therefore possible to provide an optical wavelength monitoring method that also has high tolerance to noise.

Fourth Embodiment

In a fourth embodiment, modification examples of the wavelength monitoring apparatuses and the wavelength monitoring methods according to the second and the third embodiments will be disclosed. A wavelength monitoring apparatus according to the present embodiment omits any one of the photoelectric conversion elements 407a, 407b, 407c, and 407d from the configuration shown in either FIG. 4 (the second embodiment) or FIG. 7 (the third embodiment). Since the constituent elements are described above, explanations thereof will be omitted. The present embodiment will be explained by using a configuration omitting the photoelectric conversion element 407d. However, the same explanation applies to omission of any of the other photoelectric conversion elements.

As explained in the second embodiment, it is possible to express the electrical signals (the current values) output from the photoelectric conversion elements 407a, 407b, and 407c, by using the following expressions where A is a coefficient proportional to the optical intensity of the input optical signal:

$$A(0.5+0.5 \cos(2\pi f/100+\varphi)) \qquad \text{(Expression 13)};$$

$$A(0.5-0.5 \cos(2\pi f/100+\varphi)) \qquad \text{(Expression 14); and}$$

$$A(0.5+0.5 \sin(2\pi f/100+\varphi)) \qquad \text{(Expression 15)}.$$

Further, suppose that the photoelectric conversion element 407d were installed, it would be possible to express the output electrical signal (current value) by using the following expression:

$$A(0.5-0.5 \sin(2\pi f/100+\varphi)) \qquad \text{(Expression 16)}.$$

In this situation, there is a relationship among the four electrical signals (current values) as follows: (Expression 16)=(Expression 13)+(Expression 14)−(Expression 15).

Accordingly, by calculating the ratios among these as shown below, it is possible to bring the ratios between the electrical signals (the current values) into association with the wavelength (the frequency) of the optical signal, in the same manner as in the second embodiment:

(Expression 13)/(Expression 14)={1+cos(2πf/100+ φ)}/{1−cos(2πf/100+φ)};

(Expression 14)/(Expression 13)={1−cos(2πf/100+ φ)}/{1+cos(2πf/100+φ)};

{(Expression 13)+(Expression 14)−(Expression 15)}/ (Expression 16)={1+sin(2πf/100+φ)}/{1−sin (2πf/100+φ)}; and (Expression 16)/{(Expression 13)+(Expression 14)− (Expression 15)}={1−sin(2πf/100+φ)}/{1+sin (2πf/100+φ)}.

Consequently, similarly to the description of the second embodiment, with respect to each wavelength (frequency) of the optical signal, by measuring the ratios between the electrical signals (the current values) in advance and generating and referring to a correspondence table, it is possible to obtain the wavelength of the input optical signal on the basis of the ratios between the measured electrical signals (current values).

In this situation also, similarly to the above examples, the optical wavelength monitoring method according to the present invention is able to obtain the wavelength with a higher level of accuracy than the conventional wavelength monitoring method.

It should be noted that the optical wavelength monitoring method according to the present invention is not capable of obtaining information about optical intensities which the conventional wavelength monitoring method is capable of obtaining directly. However, when the wavelength of the optical signal has become clear, because the transmittance of the wavelength monitoring circuit is determined in one-to-one correspondence, it is also possible to obtain the optical intensity of the optical signal by dividing the electrical signals (the current values) obtained from the photoelectric conversion elements by the transmittance of the wavelength monitoring circuit and multiplying the result by a prescribed coefficient.

Further, the increase in required memory capacity will be minor, even when a coefficient table is generated and stored in advance, in correspondence with each wavelength (frequency) of the optical signal, for the purpose of obtaining the optical intensity of the optical signal, the coefficient table being used for converting electrical signals (current values) obtained from the photoelectric conversion elements into an optical intensity of the optical signal.

The optical wavelength monitoring method according to the present invention does not need to use a photoelectric conversion element for monitoring the optical intensity, which is required in the conventional optical wavelength monitoring method. Accordingly, even the signals that are split in the conventional technique for the purpose of monitoring the optical intensities may be now all input to the optical wavelength monitoring circuit. It is therefore possible to provide an optical wavelength monitoring method that also has high tolerance to noise.

Fifth Embodiment

In a fifth embodiment, modification examples of the wavelength monitoring apparatuses and the wavelength monitoring methods according to the second and the third embodiments will be disclosed. A wavelength monitoring apparatus according to the present embodiment omits any one of the photoelectric conversion elements 407a, 407b, 407c, and 407d from the configuration shown in either FIG. 4 (the second embodiment) or FIG. 7 (the third embodiment). The present embodiment will be explained by using a configuration omitting the photoelectric conversion element 407d. However, the same explanation applies to omission of any of the other photoelectric conversion elements.

As explained in the fourth embodiment, it is possible to express the electrical signals (the current values) output from the photoelectric conversion elements 407a, 407b, and 407c by using Expressions 13, 14, and 15.

In this situation, the sum of Expression 13 and Expression 14 representing the electrical signals (the current values) being output by performing the photoelectric conversions on the optical signals output from the same two-input two-output optical multiplexer/demultiplexer circuit can be expressed as (Expression 13)+(Expression 14)=A.

While using A as the denominator, the ratio of each of the electrical signals (the current values) output from the photoelectric conversion elements 407a and 407c can be expressed as follows:

(Expression 13)/{(Expression 13)+(Expression 14)}= (0.5+0.5 $\cos(2\pi f/100+\varphi)$); and (Expression 15)/{(Expression 13)+(Expression 14)}= (0.5+0.5 $\sin(2\pi f/100+\varphi)$).

In the obtained ratios, the contribution of "the optical intensity of the input optical signal" is offset. The ratios are therefore kept in association only with the wavelength (the frequency) of the optical signal.

Figure 8:
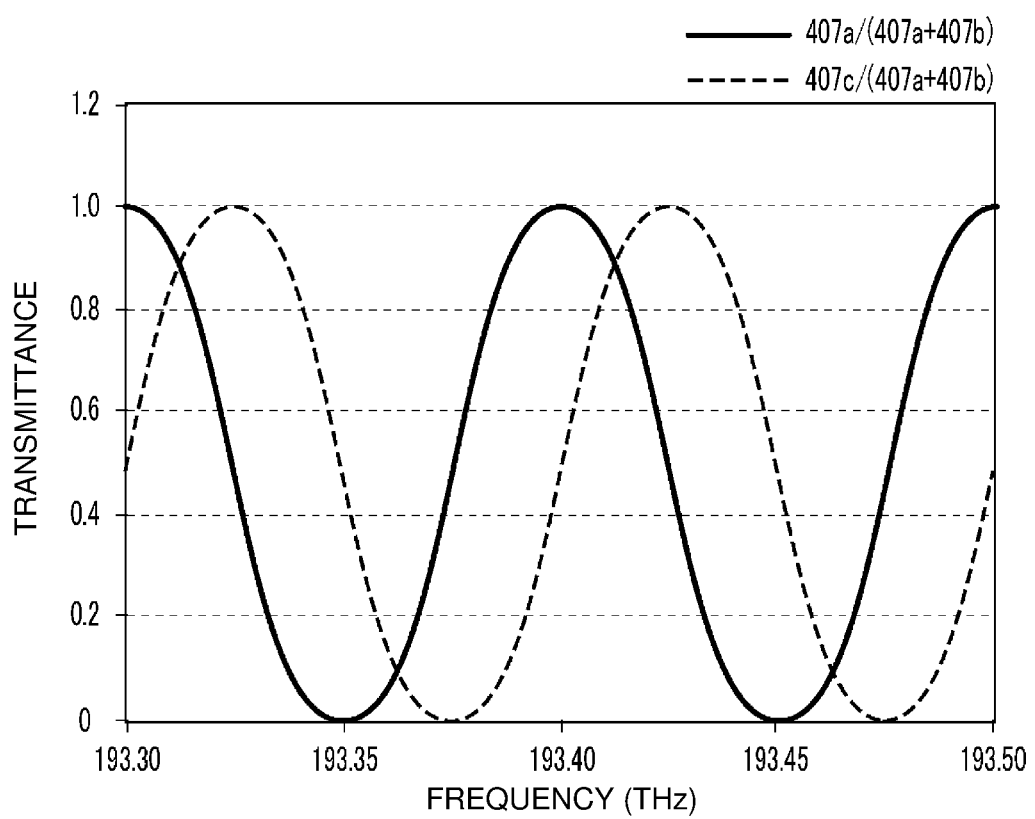
FIG. 8 is a chart showing an example of a frequency (wavelength) dependency of ratios between output electrical signals (current values) from photoelectric conversion elements used in a wavelength monitoring method according to a fifth embodiment of the present invention.
Figure 9:
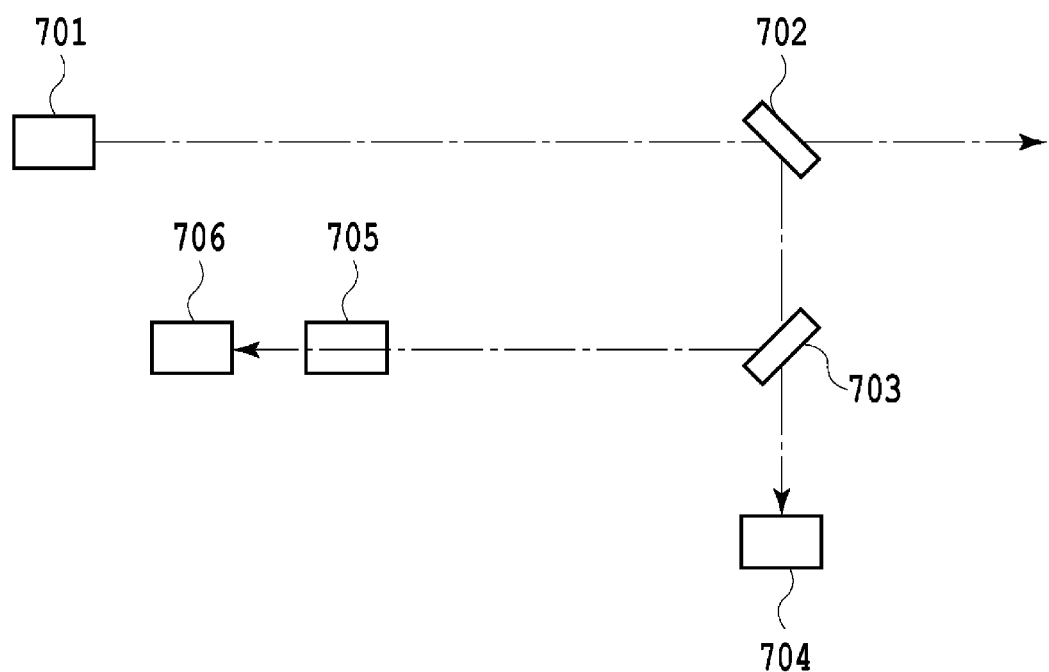
FIG. 9 is a conceptual configuration diagram of a conventional wavelength monitoring circuit.

Further, as illustrated in FIG. 8, the characteristics of the two obtained ratios are staggered by one-fourth of the cyclic period. When one of the values is at the peak or bottom, the other value is not at the peak or bottom, and vice versa. Accordingly, by selecting an appropriate one of the ratios for each wavelength of the optical signal, it is possible to find out the wavelength of the optical signal, regardless of the value of the wavelength.

In other words, regarding the ratio between one of the electrical outputs resulting from the photoelectric conversions performed on the outputs of the first two-input two-output optical multiplexer/demultiplexer circuit 406a and the sum of the electrical outputs resulting from the photoelectric conversions performed on the outputs of the first two-input two-output optical multiplexer/demultiplexer circuit 406a; and the ratio between the electrical output resulting from the photoelectric conversion performed on the output of the second two-input two-output optical multiplexer/demultiplexer circuit 406b and the sum of the electrical outputs resulting from the photoelectric conversions performed on the outputs of the first two-input two-output optical multiplexer/demultiplexer circuit 406a, by measuring, with respect to each wavelength (frequency) of the optical signal, the ratios between the electrical signals (the current values) in advance and generating and referring to a correspondence table, it is possible to obtain the wavelength of the input optical signal on the basis of the calculated ratios between the electrical signals (the current values).

In this situation, the level of accuracy of the optical wavelength monitoring method according to the present invention is approximately equal to that of the conventional wavelength monitoring method; however, there is no need to provide a dedicated optical split circuit and a dedicated photoelectric conversion element for the purpose of monitoring the optical intensity. Because it is therefore possible to input all the optical signals to the wavelength monitoring circuit having the periodic filtering characteristics, it is possible to provide an optical wavelength monitoring method that can achieve high efficiency in utilizing the optical signals and also has high tolerance to noise.

It should be noted, according to the optical wavelength monitoring method of the present invention, that the sum of (Expression 13) and (Expression 14) representing the electrical signals (the current values) being output by performing the photoelectric conversions on the optical signals output from the same two-input two-output optical multiplexer/demultiplexer circuit is proportional to the optical intensity of the input optical signal. Accordingly, by making the conversion coefficient clear in advance, it is possible to obtain information about the optical intensity.

REFERENCE SIGNS LIST 101, 401, 501 Wavelength monitoring circuit
102, 402, 404a, 404b Two-way optical split circuit
103, 403, 405, 502 Optical delay circuit
104, 406a, 406b Two-input two-output optical multiplexer/demultiplexer circuit
105a, 105b, 407a to 407d Photoelectric conversion element
503 Two-way optical split circuit, the output optical signals of which are in mutually the same phase
504 Two-way optical split circuit, the output optical signals of which have a 90-degree phase difference
505 Equal-length optical waveguides
701 Wavelength variable laser
702, 703, 707 Beam splitter
704 Photodiode 704
705, 708 Etalon filter
706, 709 Photodiode

The invention claimed is:

1. A wavelength monitoring apparatus comprising a wavelength monitoring circuit, wherein
the wavelength monitoring circuit includes:
a first split circuit that splits an input optical signal into two;
a first optical delay circuit that applies a delay time difference to the two split optical signals;
second and third split circuits that each further split, into two, a different one of the two optical signals to which the delay time difference has been applied;
a second optical delay circuit that applies a delay time difference to each of sets of optical signals derived from four optical signals resulting from the two-way splits by the second and third split circuits, the sets each being made up of two optical signals to which mutually-different delay time differences have been applied by the first optical delay circuit; and
first and second two-input two-output optical multiplexer/demultiplexer circuits that each output a result of applying multiplexing interference to the optical signals to which the delay time difference has been applied,
a difference between the delay time differences applied by the second optical delay circuit to a first set of optical signals and to a second set of optical signals can be expressed as $\lambda/4c$ where $\lambda$ is any of wavelengths in an optical signal wavelength band being monitored, while c is a speed of light,
the wavelength monitoring apparatus further includes a photoelectric conversion element that performs a photoelectric conversion on the optical signals output from the wavelength monitoring circuit so as to output electrical signals, and
the wavelength monitoring apparatus is configured to obtain a wavelength of the optical signal input to the wavelength monitoring circuit, by calculating a ratio between electrical outputs in the first set of optical signals and a ratio between electrical outputs in the second set of optical signals that are output from the photoelectric conversion element and referring to a correspondence table indicating wavelengths of optical signals input to the wavelength monitoring circuit and ratios between electrical outputs,
wherein the photoelectric conversion element that performs the photoelectric conversion on the optical signals output from the wavelength monitoring circuit so as to output the electrical signals is not provided with a photoelectric conversion element that receives an input of one optical signal in the second set of optical signals output from the second two-input two-output optical multiplexer/demultiplexer circuit, and
the wavelength monitoring apparatus has one of following configurations:
(a) being configured to obtain the wavelength of the optical signal input to the wavelength monitoring circuit by using, in place of the electrical output of one of the optical signals in the second set of optical signals, a value obtained by subtracting the electrical output being output from the photoelectric conversion element receiving an input of the other optical signal in the second set of optical signals, from a sum of the electrical outputs being output from the photoelectric conversion element receiving an input of the first set of optical signals; and
(b) being configured to obtain the wavelength of the optical signal input to the wavelength monitoring circuit, by calculating a ratio between one of the electrical outputs being output from the photoelectric conversion element receiving an input of the first set of optical signals and a sum of the electrical outputs being output from the photoelectric conversion element receiving an input of the first set of optical signals; and another ratio between the electrical output being output from the photoelectric conversion element receiving an input of the other optical signal in the second set of optical signals and a sum of the electrical outputs being output from the photoelectric conversion element receiving an input of the first set of optical signals and referring to the correspondence table indicating the wavelengths of the optical signals input to the wavelength monitoring circuit and the ratios between the electrical outputs.

2. The wavelength monitoring apparatus according to claim 1, wherein
the wavelength monitoring apparatus obtains the electrical outputs of the optical signals obtained from the photoelectric conversion element, and
the wavelength monitoring apparatus is further configured to obtain an optical intensity of the optical signal input to the wavelength monitoring circuit, by referring to a correspondence table indicating wavelengths of optical signals input to the wavelength monitoring circuit and values each calculated as "an optical intensity÷an electrical output".

3. A wavelength monitoring apparatus comprising a wavelength monitoring circuit, wherein
the wavelength monitoring circuit includes:
a first split circuit that splits an input optical signal into two;
a first optical delay circuit that applies a delay time difference to the two split optical signals;
a second split circuit that further splits, into two, one of the two optical signals to which the delay time difference has been applied and that outputs optical signals in a mutually same phase;
a third split circuit that further splits, into two, other of the two optical signals to which the delay time difference has been applied and that outputs optical signals having a 90-degree phase difference; and
first and second two-input two-output optical multiplexer/demultiplexer circuits that each receive an input, via equal-length optical waveguides, of a different one of sets of optical signals derived from four optical signals resulting from the two-way splits by the second and the third split circuits and that each output a result of multiplexing interference, the sets each being made up of two optical signals to which mutually-different delay time differences have been applied by the first optical delay circuit, the wavelength monitoring apparatus further includes a photoelectric conversion element that performs a photoelectric conversion on the optical signals output from the wavelength monitoring circuit so as to output electrical signals, and the wavelength monitoring apparatus is configured to obtain a wavelength of the optical signal input to the wavelength monitoring circuit, by calculating a ratio between electrical outputs in a first set of optical signals and a ratio between electrical outputs in a second set of optical signals that are output from the photoelectric conversion element and referring to a correspondence table indicating wavelengths of optical signals input to the wavelength monitoring circuit and ratios between electrical outputs, wherein the photoelectric conversion element that performs the photoelectric conversion on the optical signals output from the wavelength monitoring circuit so as to output the electrical signals is not provided with a photoelectric conversion element that receives an input of one optical signal in the second set of optical signals output from the second two-input two-output optical multiplexer/demultiplexer circuit, and the wavelength monitoring apparatus has one of following configurations:

(a) being configured to obtain the wavelength of the optical signal input to the wavelength monitoring circuit by using, in place of the electrical output of one of the optical signals in the second set of optical signals, a value obtained by subtracting the electrical output being output from the photoelectric conversion element receiving an input of the other optical signal in the second set of optical signals, from a sum of the electrical outputs being output from the photoelectric conversion element receiving an input of the first set of optical signals; and (b) being configured to obtain the wavelength of the optical signal input to the wavelength monitoring circuit, by calculating a ratio between one of the electrical outputs being output from the photoelectric conversion element receiving an input of the first set of optical signals and a sum of the electrical outputs being output from the photoelectric conversion element receiving an input of the first set of optical signals; and another ratio between the electrical output being output from the photoelectric conversion element receiving an input of the other optical signal in the second set of optical signals and a sum of the electrical outputs being output from the photoelectric conversion element receiving an input of the first set of optical signals and referring to the correspondence table indicating the wavelengths of the optical signals input to the wavelength monitoring circuit and the ratios between the electrical outputs.

4. The wavelength monitoring apparatus according to claim 3, wherein the wavelength monitoring apparatus obtains the electrical outputs of the optical signals obtained from the photoelectric conversion element, and the wavelength monitoring apparatus is further configured to obtain an optical intensity of the optical signal input to the wavelength monitoring circuit, by referring to a correspondence table indicating wavelengths of optical signals input to the wavelength monitoring circuit and values each calculated as "an optical intensity÷an electrical output".

* * * * *